(12) United States Patent
Lee (10) Patent No.: US 11,623,825 B2
(45) Date of Patent: Apr. 11, 2023

(54) CPS-BASED SMART FORKLIFT TRUCK MANAGEMENT DEVICE

(71) Applicant: 4STEC INC., Incheon (KR)

(72) Inventor: Seung Won Lee, Incheon (KR)

(73) Assignee: 4STEC INC., Incheon (KR)

( * ) Notice: Subject to any disclaimer, the term of this patent is extended or adjusted under 35 U.S.C. 154(b) by 358 days.

(21) Appl. No.: 16/762,369

(22) PCT Filed: Apr. 29, 2019

(86) PCT No.: PCT/KR2019/005131
§ 371 (c)(1),
(2) Date: May 7, 2020

(87) PCT Pub. No.: WO2020/213780
PCT Pub. Date: Oct. 22, 2020

(65) Prior Publication Data
US 2021/0284448 A1   Sep. 16, 2021

(30) Foreign Application Priority Data
Apr. 18, 2019 (KR) .......................... 10-2019-0045290

(51) Int. Cl.
*B65G 1/137* (2006.01)
*B66F 9/075* (2006.01)
*G06Q 10/08* (2023.01)

(52) U.S. Cl.
CPC ........ *B65G 1/1371* (2013.01); *B66F 9/07581* (2013.01); *G06Q 10/08* (2013.01)

(58) Field of Classification Search
CPC .... B65G 1/1371; B66F 9/07581; G06Q 10/08
(Continued)

(56) References Cited

U.S. PATENT DOCUMENTS 8,892,241 B2 * 11/2014 Weiss .................. B65G 1/1378
700/229
2016/0129592 A1 * 5/2016 Saboo .................... B25J 9/1661
700/248
(Continued)

FOREIGN PATENT DOCUMENTS

JP   2007-112523 A   5/2007
JP   2007-246250 A   9/2007
(Continued)

OTHER PUBLICATIONS

International Search Report for PCT/KR2019/005131 dated Jan. 17, 2020 from Korean Intellectual Property Office.

*Primary Examiner* — Ahshik Kim
(74) *Attorney, Agent, or Firm* — Paratus Law Group, PLLC (57) ABSTRACT

A CPS-based smart forklift truck management device includes a space information collector collecting distribution warehouse space information, a distribution warehouse visualizer which generates a digital twin for a distribution warehouse space based on the collected distribution warehouse space information and visualizes a loading situation of an article storage and a movement situation of a forklift truck on the distribution warehouse space digital twin, a movement path information provider which selects a target location at which an article is to be stored based on the visualized distribution warehouse space digital twin and provides information a path through which the forklift truck is movable to the target location, and a height adjustment information provider which provides forklift height adjustment information of the forklift truck according to a location of a storage cell corresponding to the article storage when the forklift truck arrives at the article storage corresponding to the target location.

7 Claims, 4 Drawing Sheets

(58) Field of Classification Search
USPC .......................................................... 700/218
See application file for complete search history.

(56) References Cited

U.S. PATENT DOCUMENTS

2018/0143312 A1* 5/2018 High ....................... H04W 4/33
2018/0273292 A1   9/2018 High et al.
2019/0303850 A1* 10/2019 Mangos ............... G06Q 10/087

FOREIGN PATENT DOCUMENTS

| KR | 10-2009-0112463 A | 10/2009 |
| KR | 10-2010-0115515 A | 10/2010 |
| KR | 10-2018-0126257 A | 11/2018 |
| KR | 10-2019-0023714 A | 3/2019 |

* cited by examiner

CPS-BASED SMART FORKLIFT TRUCK MANAGEMENT DEVICE

CROSS-REFERENCE TO PRIOR APPLICATIONS

This application is a National Stage Patent Application of PCT International Patent Application No. PCT/KR2019/005131 (filed on Apr. 29, 2019) under 35 U.S.C. § 371, which claims priority to Korean Patent Application No. 10-2019-0045290 (filed on Apr. 18, 2019), which are all hereby incorporated by reference in their entirety.

BACKGROUND

The present disclosure relates to a smart forklift truck management technology based on a Cyber-Physical System (CPS), and more specifically, a CPS-based smart forklift truck management device which visualizes a supply chain of a distribution warehouse through a digital twin for a space within the distribution warehouse and tracks an article loading location and a forklift truck location so as to optimize and manage a movement path of a forklift truck.

When a wide variety of products and materials are loaded in a distribution warehouse, if a location at which a certain matter is stored is not appropriately checked, large losses in terms of time, money, and labor are inevitable. Accordingly, many companies invest a lot of money so as to efficiently manage their distribution warehouses.

In recent years, a supply chain management system is popular, which integrates and manages systems throughout the entire process in which articles are supplied from a first supplier to a final consumer.

In particular, a distribution warehouse management is a key element of the supply chain management system (SCMS), and prior arts have been proposed to increase efficiency of inventory management, loading, receiving, and shipping in a distribution warehouse.

For example, Korean Laid-Open Patent Publication No. 10-2009-0112463 (published on Oct. 28, 2009) relates to logistics management system and method using RFID, which include an article information tag which is installed in a pallet and stores article information on an article loaded on the pallet, location information tag which is installed in the front side of an article storage including a plurality of storage cells to store an article and store horizontal axis location information on the storage cells, an RFID recognizer which is installed in a forklift truck for moving the pallet and placing the article loaded on the pallet on the article storage and recognizes the article information and the horizontal axis location information through wireless communication between the article information tag and the location information tag, a distance meter which is installed in the forklift truck to recognize vertical axis location information of the storage cell placed on the pallet, and a center controller which performs a logistics management using the article information, the horizontal axis location information, and the vertical axis location information transmitted from the RFID recognizer and the distance meter. Accordingly, it is possible to correctly detail information on the location of the stored article and the stored article in real time to maximize efficiency of the logistic management.

In addition, for example, Korean Laid-Open Patent Publication No. 10-2010-0115515 (published on Oct. 28, 2010) relates cargo location recognition device and method using an RFID electronic tag attached to a ceiling, which include a first RFID electronic tag which is attached to a ceiling of a distribution warehouse and transmits information to find out a location, a second RFID electronic tag which is attached at a location adjacent to a cargo and transmits cargo information including at least one of a type, characteristics, a data (manufacture date, receipt date, expiration date, or the like), and precautions of an article, a RFID reader which is installed in a forklift truck for stocking, loading, and carrying a cargo and receives information for finding out a location transmitted from the first RFID electronic tag and the cargo information transmitted from the second RFID electronic tag, and a cargo loading location management which checks loading location information on the cargo based on the location information of the first RFID electronic tag attached to a specific portion of a ceiling recognized by the RFID leader when the cargo moves to the forklift truck at the time of receiving or shipping the cargo and the cargo information of the second RFID electronic tag and manages the receiving or shipping of the cargo.

SUMMARY

The present disclosure provides a CPS-based smart forklift truck management device capable of visualizing a supply chain of a distribution warehouse through a digital twin for a space within the distribution warehouse and tracking an article loading location and a forklift truck location so as to optimize and manage a movement path of a forklift truck.

The present disclosure also provides a CPS-based smart forklift truck management device capable of tracking a movement direction of a forklift truck through RFID readers disposed on both right and left sides of the forklift truck to provide information on a movable path of the forklift truck.

The present disclosure also provides a CPS-based smart forklift truck management device capable of effectively selecting loading locations for a plurality of articles received in a distribution warehouse.

The present disclosure also provides a CPS-based smart forklift truck management device capable of providing height adjustment information of a forklift of the forklift truck according to a location of a storage cell on which an article is loaded among a plurality of storage cells located in an article storage.

The present disclosure also provides a CPS-based smart forklift truck management device capable of checking whether or not a forklift truck is actually driven according to a dispatch schedule of the forklift truck and whether or not a driver of the forklift truck is registered to manage a forklift truck driving history.

In an aspect, there is provided a CPS-based smart forklift truck management device including: a space information collector configured to collect distribution warehouse space information; a distribution warehouse visualizer configured to generate a digital twin for a distribution warehouse space based on the collected distribution warehouse space information and visualize a loading situation of an article storage and a movement situation of a forklift truck on the distribution warehouse space digital twin; a movement path information provider configured to select a target location at which an article is to be stored based on the visualized distribution warehouse space digital twin and provides information a path through which the forklift truck is movable to the target location to the forklift truck; and a height adjustment information provider configured to provide forklift height adjustment information of the forklift truck according to a location of a storage cell corresponding to the article storage when the forklift truck arrives at the article storage corresponding to the target location.

The space information collector may identify a RFID tag located in the article storage through an RFID reader array located on a ceiling of the distribution warehouse to collect location information on an article storage zone and a passage zone and may identify a RFID tag located in the forklift truck to collect identification information and location information of the forklift truck.

The space information collector may identify a RFID tag located in the article stored in an adjacent article storage while the forklift truck moves through a RFID reader disposed on each of a right side and a left side of the forklift truck to collect movement direction information of the forklift truck.

The space information collector may identify a RFID tag of the article storage cell located in front of the forklift truck through a RFID reader located on a front side of the forklift truck to collect location information of a cell to store the article.

In consideration of disposition on an array for a specific RFID reader identifying the RFID tag from the distribution warehouse space information, the distribution warehouse visualizer may generate a first location coordinate based on a horizontal plane for the article storage and the passage and a second location coordinate based on a horizontal plane for the forklift truck to visualize the loading situation of the article storage and the movement situation of the forklift truck on the distribution warehouse space digital twin.

The movement path information provider may provide a shortest path through which the forklift truck can move between a target location at which the article is to be stored based on a bottom surface of a passage of the article distribution warehouse and a current location of the forklift truck to a display panel disposed in the forklift truck.

The movement path information provider may determine the article storage of the article associated with the article of the forklift truck based on an article loading status including a type of the article to be stored in the article storage and a load capacity of the article storage, select a location of the article storage as the target location, and generate an article loading path plan based on the current location of the forklift truck.

The height adjustment information provider may identify a tag attached to the storage cell of the article storage through an RFID reader disposed on a front side of the forklift truck to obtain a height from a bottom surface to the storage cell and may provide the height to the storage cell to a display panel attached to the forklift truck.

The CPS-based smart forklift truck management device may further include a forklift truck driving history management configured to check whether or not the forklift truck is driven according to a dispatch schedule and whether or not a driver is registered based on the identification information of the forklift truck collected by the space information collector and manage a forklift truck driving history including the driver and a driving time of the forklift truck to control driving of the forklift truck.

DETAILED DESCRIPTION

According to a best mode for implementing the present disclosure, there is provided A CPS-based smart forklift truck management device including a space information collector configured to collect distribution warehouse space information, a distribution warehouse visualizer configured to generate a digital twin for a distribution warehouse space based on the collected distribution warehouse space information and visualize a loading situation of an article storage and a movement situation of a forklift truck on the distribution warehouse space digital twin, a movement path information provider configured to select a target location at which an article is to be stored based on the visualized distribution warehouse space digital twin and provides information a path through which the forklift truck is movable to the target location to the forklift truck, and a height adjustment information provider configured to provide forklift height adjustment information of the forklift truck according to a location of a storage cell corresponding to the article storage when the forklift truck arrives at the article storage corresponding to the target location.

The present disclosure is only an example for structural or functional explanation, and thus, a scope of the present disclosure should not be construed as limited by embodiments set forth herein. That is, the embodiments may be variously modified and may have various forms, and thus, the scope of the present disclosure should be understood to include equivalents capable of realizing a technical idea. In addition, purposes or effects disclosed in the present disclosure do not mean that a specific embodiment should include all purpose or effects or only the effects, and thus, the scope of the present disclosure should not be understood as being limited thereby.

Meanwhile, meanings of terms described in the present application should be understood as follows.

Terms "first" and "second" are used to distinguish one component from another component, and the scope of the present disclosure should not be limited by these terms. For example, a first component may be referred to as a second component, and similarly, a second component may also be referred to as a first component.

When a component is referred to as being "connected" to another component, it should be understood that there may be other components therebetween, although the component may be directly connected to another component. On the other hand, when a component is referred to as being "directly connected" to another component, it should be understood that there is no other component therebetween. Meanwhile, other expressions which describe the relationship between components, such as "between" and "just between" or "neighboring to" and "directly adjacent to", should be interpreted similarly.

It should be understood that singular expressions include plural expressions unless the context clearly indicates otherwise. Moreover, terms such as "comprise" or "have" are intended to indicate that embodied features, number, step, action, component, part or combination thereof is present, and should be understood that one or more other features, numbers, steps, actions, components, parts or combinations thereof are not excluded in advance.

In each step, an identification code (for example, a, b, c, or the like) is used for convenience of explanation, and the identification code does not describe the order of each step, and each step may occur out of the stated order unless the context clearly dictates the specific order. That is, respective steps may occur in the same order as specified, may be performed substantially simultaneously, or may be performed in the reverse order.

The present disclosure may be embodied as computer readable code on a computer readable recording medium, and the computer readable recording medium may include all kinds of recording devices for storing data which can be read by a computer system. Examples of computer readable recording media include a ROM, a RAM, a CD-ROM, a magnetic tape, a floppy disk, and an optical data storage.

All terms used herein have the same meaning as commonly understood by a person skilled in the art to which the present disclosure belongs, unless otherwise defined. In general, terms defined in the dictionary used should be interpreted to coincide with the meanings in the context of the related art, and should not be interpreted as having ideal or excessively formal meanings unless clearly defined in the present application.

A Radio Frequency Identification (RFID) is a technology for wirelessly recognizing an object and is largely divided into an RFID tag which stores recognition information and an RFID reader which reads the information. The RFID tag and the RFID reader perform transmission of information with electronic waves as a medium using an antenna mounted on each of the RFID tag and the RFID reader.

A digital twin is one of key technologies of the Fourth Industrial Revolution. The digital twin means a digital replica which is exactly like a physical entity. This digital replica digitally records how the physical product causes is changed in various environmental changes. Among them, space information is evolved from a level of a static expression into a dynamic "digital twin space" in which a real world and a virtual world can be coupled to each other and can interact with each other.

The present disclosure collects space information in a distribution warehouse through an RFID to implement a digital twin for a distribution warehouse space and visualize a distribution warehouse supply chain using the digital twin.

Figure 1:
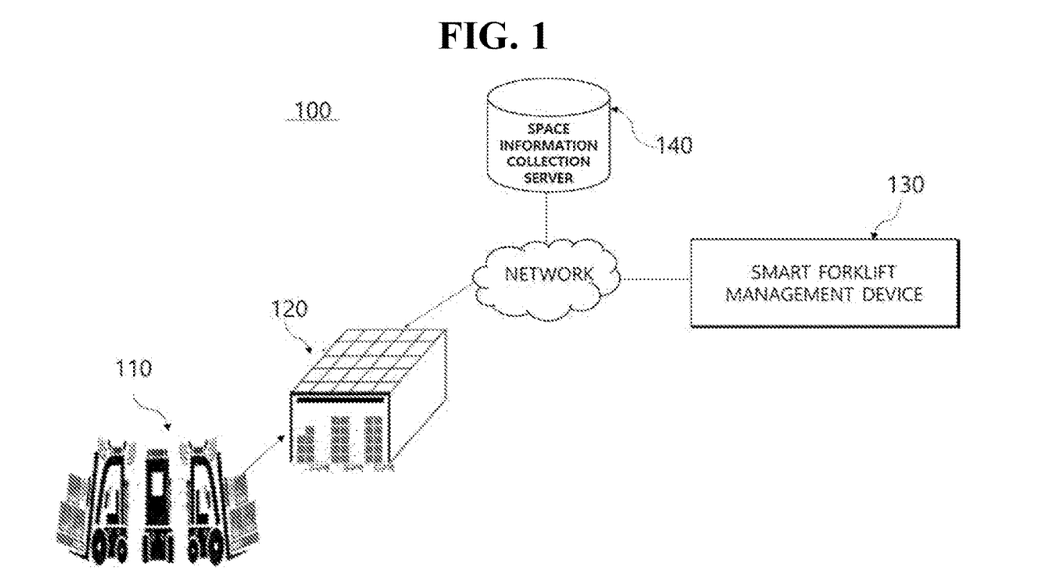
FIG. 1 is a diagram explaining a CPS-based smart forklift truck management system according to an embodiment of the present disclosure.

FIG. 1 is a diagram explaining a CPS-based smart forklift truck management system according to an embodiment of the present disclosure.

Referring to FIG. 1, a smart forklift truck management system 100 includes at least one RFID reader 110, an RFID reader array 120, a smart forklift truck management device 130, and a space information collection server 140, which can be coupled to each other through a network.

At least one RFID reader 110 may correspond to a device which identifies tags attached to an article and an article storage to manage the article and transmit tag information for implementing the digital twin for a distribution warehouse internal space.

At least one RFID reader 110 may be disposed in association with a forklift truck, and may identify the article tag or the article storage tag during a transportation or movement of the forklift truck. Here, the article tag may be attached to each article and may store tag information (that is, article identification information) associated with the article. The article storage tag may be attached to each storage cell of the article storage and may store tag information (that is, storage cell location information) associated with the storage cell.

At least one RFID reader may be disposed on each of a front surface, a left surface, and a right surface of the forklift truck. In this case, it is possible to identify a movement direction of the forklift truck from a location at which the RFID reader reading the tag information is disposed.

The RFID reader array 120 corresponds to a computing device which is coupled to the smart forklift truck management device 130 and the space information collection server 140 through a network. The RFID reader array 120 includes a plurality of RFID readers disposed in an array on the ceiling of the distribution warehouse, and the plurality of RFID readers may include an antenna, a distributor, and a data transceiver. Here, the antenna may receive an RFID signal attached to an upper side of the forklift truck, may transmit a response signal to the received RFID signal, and may be arranged to have an array structure so as to effectively detect the location of the forklift truck. The distributor may be coupled to between the antenna and the data transceiver to extend the antenna, and the data transceiver may transmit the collected data by recognizing the RFID tag to the smart forklift truck management device 130 and the space information collection server 140 through the network.

A range recognized by the RFID reader array 120 may be divided into an article zone and a passage zone.

The RFID reader array 120 may identify a tag attached to the forklift truck while the forklift truck moves the distribution warehouse passage zone. Here, the tag of the forklift truck may be attached to an upper side (that is, a safety roof of the forklift truck) of the forklift truck to store tag information (that is, forklift truck identification information) associated with the forklift truck.

The smart forklift truck management device 130 corresponds to a computing device which is coupled to at least one RFID reader 110 disposed in association with the forklift truck, the RFID reader array 120 disposed at the ceiling of the distribution warehouse, and the space information collection server 140 through a network.

The smart forklift truck management device 130 builds a physical space of the distribution warehouse as a cyber space based on the tag information identified through at least one RFID reader 110 and the RFID reader array 120 so as to implement the digital twin for the distribution warehouse space. The smart forklift truck management device 130 may visualize the supply chain of the distribution warehouse and manage the forklift truck using the digital twin for the distribution warehouse space.

The space information collection server 140 corresponds to a database which can be coupled to at least one RFID reader 110, the RFID reader array 120, and the smart forklift truck management device 130 through a network. The space information collection server 140 may store the article storage zone, the passage zone, the forklift truck location information, and the article information in the distribution warehouse space provided by at least one RFID reader 110 and the RFID reader array 120.

Figure 2:
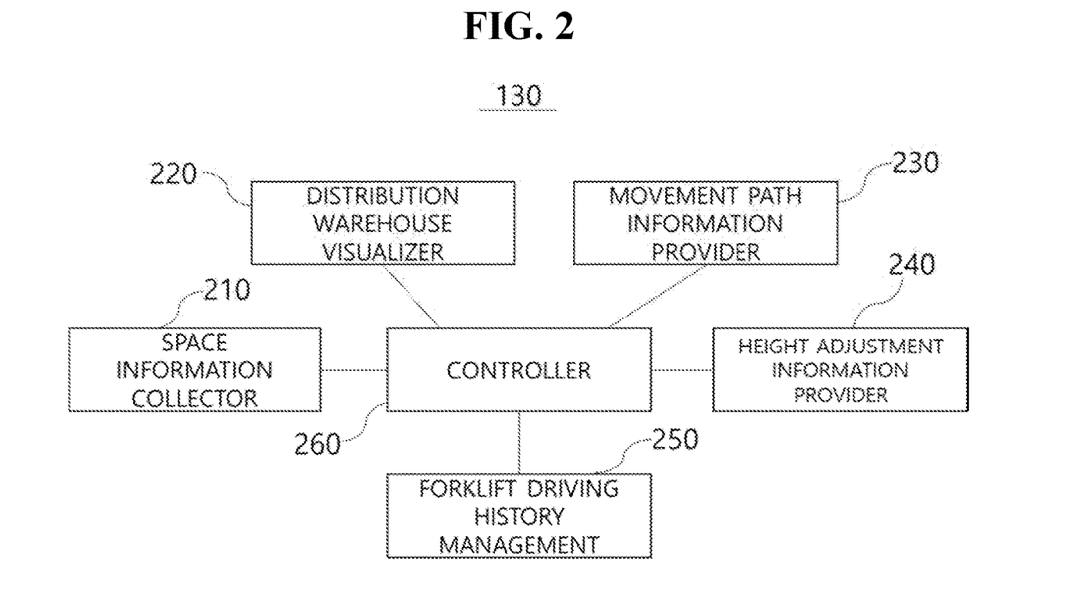
FIG. 2 is a block diagram illustrating a smart forklift truck management device of FIG. 1.

FIG. 2 is a block diagram illustrating the smart forklift truck management device 130 of FIG. 1.

Referring to FIG. 2, the smart forklift truck management device 130 includes a space information collector 210, a distribution warehouse visualizer 220, a movement path information provider 230, a height adjustment information provider 240, a forklift truck drive history management 250, and a controller 260.

The space information collector 210 may collect the distribution warehouse space information. In an embodiment, as illustrated in FIG. 3, the space information collector 210 may collect information on an article storage zone 310 and a passage zone 320 inside the distribution warehouse through the RFID reader array 120 disposed on the ceiling of the distribution warehouse.

Figure 3:
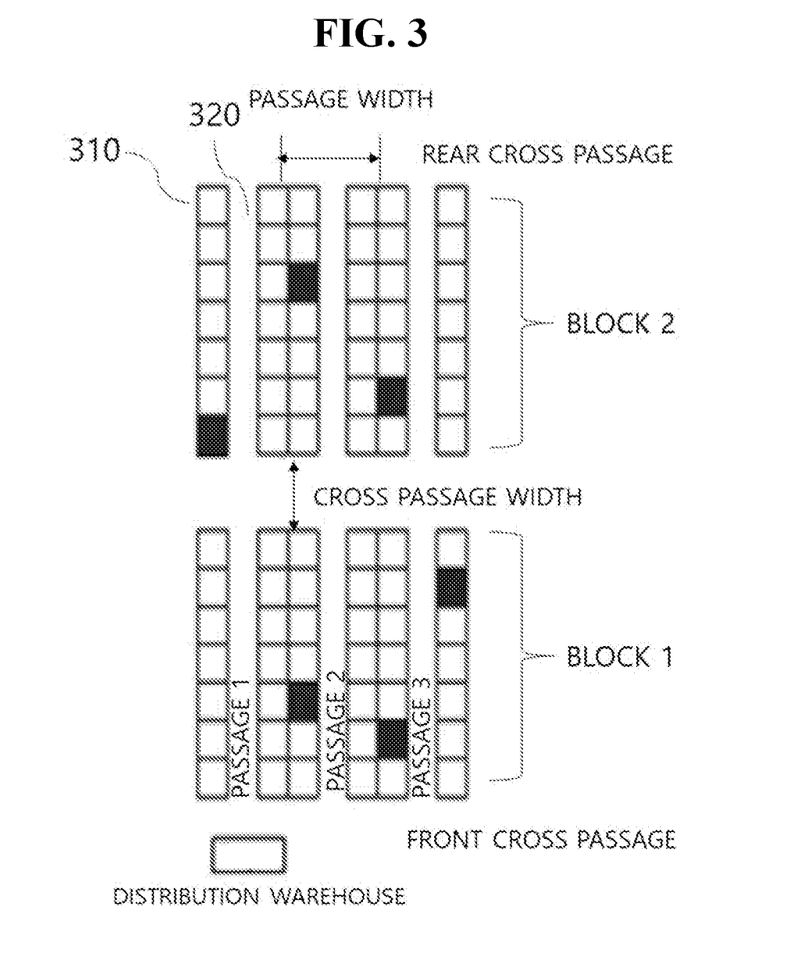
FIG. 3 is an exemplary diagram illustrating a process of collecting space information in a distribution warehouse of a space information collector of FIG. 2.

FIG. 3 is an exemplary diagram illustrating a process of collecting the space information inside the distribution warehouse of the space information collector 210 of FIG. 2.

Referring FIG. 3, the article storage zone 310 corresponds to a place where the article storage capable of loading a plurality of articles is installed inside the distribution warehouse, and the article storage zone 310 may be set to have a range preset by the user for each article storage.

The number of article storage zones 310 may be as many as the number of article storages located in the distribution warehouse, and an identification number of the article storage zone 310 matches a serial number of the article storage located in the distribution warehouse. However, the identification number may be changed by the user.

The passage zone 320 corresponds to all areas inside the distribution warehouse except for the article storage zone 310, and the passage zone 320 may be set for a purpose of recognize an intermediate step in which the location of the forklift truck moves from the article storage zone 310 to another article storage zone 310.

Referring back to FIG. 2, the space information collector 210 may identify the article storage tag through the RFID reader array 120 and may collect the location information so that the article storage zone 310 and the passage zone 320 are classified according to whether or not the article storage tag is identified.

In an embodiment, the space information collector 210 may identify a tag of the forklift truck located in the passage zone 320 through the RFID reader array 120 to collect the location information on the forklift truck. Here, the space information collector 210 may detect a specific RFID reader which is most highly associated with the forklift truck on a specific time basis and may collect the location information of the forklift truck according to a disposition on an array related to the detected specific RFID reader. In this case, the specific time may be determined based on the following Expression.

$$T=\{Rmax*(Nmax-N)\}/(Vmax*Nmax) \qquad [\text{Expression 1}]$$

Here, T is the specific time for the forklift truck to enter the passage zone, Rmax is a maximum recognition distance of the RFID reader array, Nmax is a maximum number of recognitions per unit time of the RFID reader array, N is a number of recognitions per unit time of the RFID reader at a current location of the forklift truck, and Vmax is a maximum signal transmission speed of the RFID tag.

The space information collector 210 may collect identification information of the forklift truck when collecting the location information of the forklift truck. Here, the forklift truck identification information corresponds to a unique information assigned for each forklift truck.

In an embodiment, the space information collector 210 may identify RFID tags of the article and the article storage cell through at least one RFID reader 110 associated with the forklift truck to collect article loading location information of the article storage and movement direction information of the forklift truck. The space information collector 210 may identify a RFID tag of an article stored in an adjacent article storage during the movement of the forklift truck through the RFID readers respectively disposed on the left side and the right side of the forklift truck to collect the movement direction information of the forklift truck. For example, if a tag detection area of the RFID reader disposed on the left side of the forklift truck is wider than a tag detection area of the RFID reader disposed on the right side, the forklift truck moves left and the movement direction information can be collected. On the other hand, if the tag detection area of the RFID reader disposed on the right side is wider than the tag detection area of the RFID reader disposed on the right side, the forklift truck moves right and the movement direction information can be collected.

The space information collector 210 may identify an article tag and an article storage cell tag located in front of the forklift truck through the RFID reader 110 disposed on the front side of the forklift truck to collect article loading location information.

The distribution warehouse visualizer 220 may generate the digital twin for the distribution warehouse space based on the distribution warehouse space information collected through the space information collector 210 and may visualize a loading situation of the article storage and a movement situation of the forklift truck on the distribution warehouse space digital twin. In an embodiment, the distribution warehouse visualizer 220 may build a three-dimensional simulation for the distribution warehouse space to implement the digital twin for the distribution warehouse space. Here, the distribution warehouse visualizer 220 may analyze the space information collected from the RFID reader array 110 to build the same physical space inside the distribution warehouse on the cyber space.

In an embodiment, in consideration of the disposition on the array for the specific RFID reader identifying the RFID tag, the distribution warehouse visualizer 220 may generate a first location coordinate based on a horizontal plane for a logistics storage zone and the passage zone and a second location coordinate based on a horizontal plane for the forklift truck to visualize the loading situation of the article storage and the movement situation of the forklift truck on the digital twin of the distribution warehouse space. Here, the first and second location coordinates are based on a cross section from above with respect to the RFID reader array 120 and may include an X coordinate and a Y coordinate respectively having an X axis corresponding to a first axis and a Y axis corresponding to a second axis as a center.

The distribution warehouse visualizer 220 may visualize an article loading status (that is, article type, load capacity) of the article storage in the article storage zone 310 from the space information collected through at least one RFID reader 110 identifying the article tag.

The movement path information provider 230 may select a target location at which the article of the forklift truck is to be stored based on the distribution warehouse space digital twin visualized through the distribution warehouse visualizer 220 and may provide information on a path through which the forklift truck can move the target location to the forklift truck. In an embodiment, the movement path information provider 230 may provide a shortest path through which the forklift truck can move between a target location at which the article is to be stored based on a bottom surface of the passage of the article distribution warehouse and a current location of the forklift truck to a display panel disposed in the forklift truck. For example, the movement path information provider 230 can check a storage zone in which the article is received based on the visualized distribution warehouse space through the distribution warehouse visualizer 220 and may display article information including information of the checked storage zone on the display panel. Moreover, the movement path information provider 230 may generate an article loading path plan based on the current location of the forklift truck for at least one article loaded on the forklift truck based on information of the article stored in the article storage and may provide the generated article lading path plan to the display panel disposed in the forklift truck. For example, when the forklift carries loads an article referred to as "A" and enters the distribution warehouse, the movement path information provider 230 may provide a moveable shortest path between the location of the article storage in which the "A" article is stored in the article storage zone 310 of the distribution warehouse and the current location of the forklift truck. A driver of the forklift truck may drive the forklift truck along the movement path provided on the display panel to load the article in a storage zone A.

If the forklift truck arrives at the article storage corresponding to the target location, the height adjustment information provider 240 may provide forklift height adjustment information of the forklift truck according to the location of the storage cell. In an embodiment, the height adjustment information provider 240 may identify the tag attached to the storage cell of the article storage through the RFID reader 110 disposed on the front side of the forklift truck to obtain a height h from the bottom surface to the storage cell, and may provide forklift truck lifting/lowering height information of the forklift truck according to the height h up to the storage cell to the display panel disposed in the forklift truck to correctly lift or lower the forklift of the forklift truck to the location of the storage cell.

The forklift truck driving history management 250 may check whether or not the forklift truck is driven according to the dispatch schedule of the forklift truck and check whether or not the driver who rides on the forklift truck is registered to manage a driving history. Here, the dispatch schedule may correspond to a driving diary in which a driving order or the like of the forklift truck is set according to time. In an embodiment, the forklift truck driving history management 250 may check whether or not the forklift truck actually driven in the distribution warehouse is driven according to a schedule based on the collected forklift truck identification information and check an approximate driving time through the checking of the driven forklift truck. The forklift truck driving history management 250 may check whether or not the drive who rides on the forklift truck is the driver registered in the forklift truck through a personal authentication process of the driver who rides on the forklift truck. Here, the personal authentication may use biometric information registered in advance by the driver such as fingerprint recognition or iris recognition. When a non-registrant rides on the forklift truck, the forklift truck driving history management 250 may operate an alarm or a warning light installed in the forklift truck or the distribution warehouse to generate an alarm and notify the surroundings. In this case, the forklift truck driving history management 250 may directly control the forklift truck so that the forklift truck is not started. The forklift truck driving history management 250 may restrict a permission of the forklift truck to enter the distribution warehouse so as to prevent the forklift truck from carrying and moving the article illegally.

The controller 260 may control all operations of the smart forklift truck management device 130 and control a control flow and a data from between the space information collector 210, the distribution warehouse visualizer 220, the movement path information provider 230, the height adjustment information provider 240, and the forklift truck driving history management 250.

Figure 4:
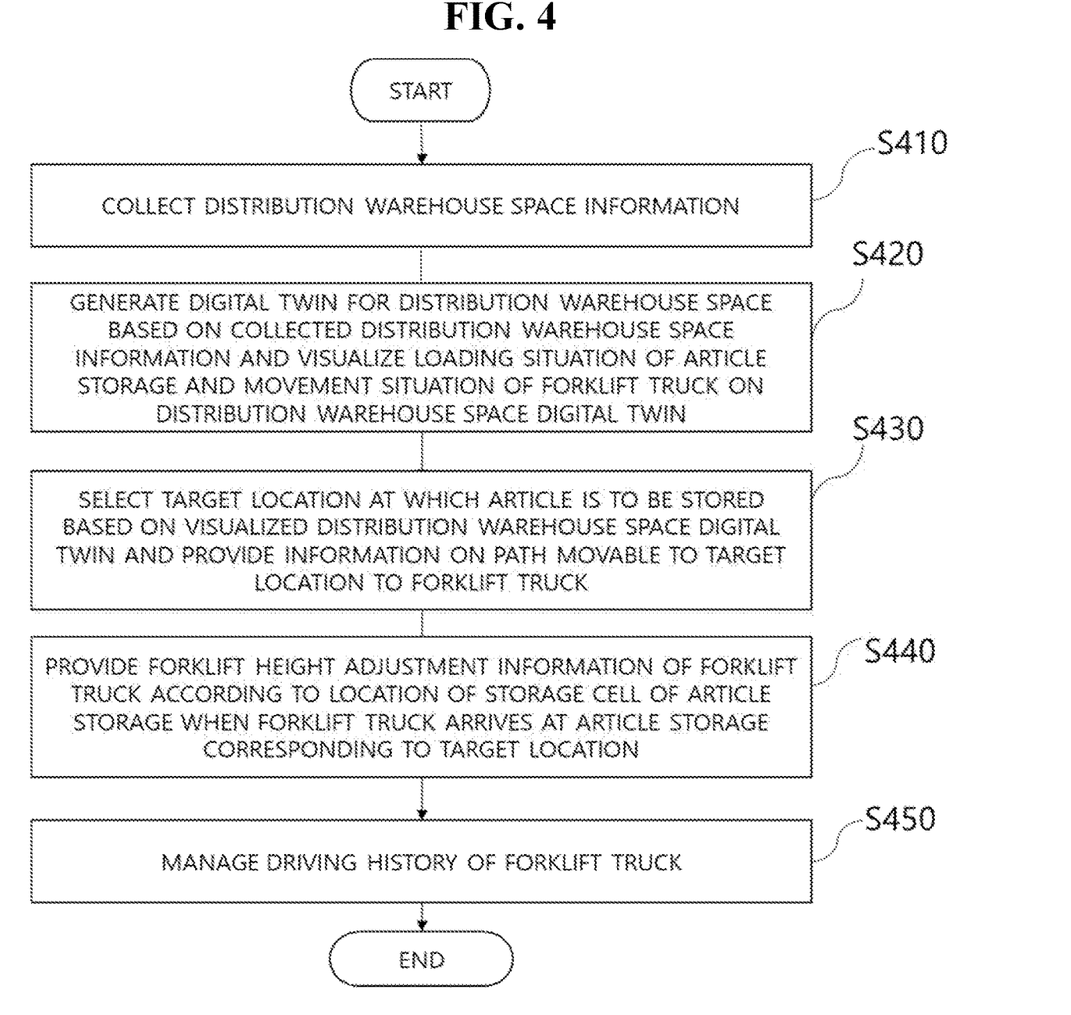
FIG. 4 is a flowchart illustrating a smart forklift truck management process performed by the smart forklift truck management device of FIG. 1.

FIG. 4 is a flowchart illustrating a smart forklift truck management process performed by the smart forklift truck management device of FIG. 1.

In FIG. 4, the smart forklift truck management device 130 may collect the distribution warehouse space information (Step S410). More specifically, the smart forklift truck management device 130 may collect the location information on the article zone 310 and the passage zone 320, the article storage information of the article storage located in the article storage zone 310, and the identification information and location information of the forklift truck through the space information collector 210. The space information collector 210 may collect the article distribution warehouse space information through at least one RFID reader 110 disposed in association with the forklift truck and the RFID reader array 120 disposed on the ceiling of the distribution warehouse.

The smart forklift truck management device 130 may generate the digital twin for the distribution warehouse space based on the collected distribution warehouse space information and visualize the loading situation of the article storage and the movement situation of the forklift truck on the distribution warehouse space digital twin (Step S420). In an embodiment, the smart forklift truck management device 130 may form the distal twin of the distribution warehouse space obtained by virtualizing the physical distribution warehouse space actually through the distribution warehouse visualizer 220 to obtain the correct information for the transport process and the movement process of the forklift truck of the actual distribution warehouse.

The smart forklift truck management device 130 may select the target location at which the article of the forklift truck is to be stored based on the visualized distribution warehouse space digital twin and provide the information on the path through which the forklift truck can move the target location to the forklift truck. In an embodiment, the smart forklift truck management device 130 may determine the article storage of the article associated with the article of the forklift truck based on the article loading status (article type, load capacity) of the article storage through the movement path information provider 230 and select the location of the article storage as the target location. If the article storage target location is determined, the movement path information provider 230 may provide the shortest movement path to the target location based on the current location information of the forklift truck so that the forklift truck moves along the shortest movement path to arrive at the target location (the article storage zone).

If the forklift truck arrives at the article storage corresponding to the target location, the smart forklift truck management device 130 may provide the forklift height adjustment information of the forklift truck according to the location of the storage cell of the article storage (Step S440). More specifically, the smart forklift truck management device 130 may provide the forklift height adjustment information to the forklift truck through the height adjustment information provider 240 so that the height of the forklift correctly matches the height of the storage cell of the article storage. The height adjustment information provider 240 may identify the storage cell tag attached to each storage cell of the article storage to determine the forklift height of the forklift truck from the location information of the storage cell stored in the tag information.

The smart forklift truck management device 130 may manage the driving history of the forklift truck (Step S450). The smart forklift truck management device 130 may check whether or not the forklift truck is actually driven and whether or not the driver of the forklift truck is registered according to the dispatch schedule of the forklift truck to manage the forklift truck driving history such as who (forklift truck drive) or when (driving time).

Figure 5:
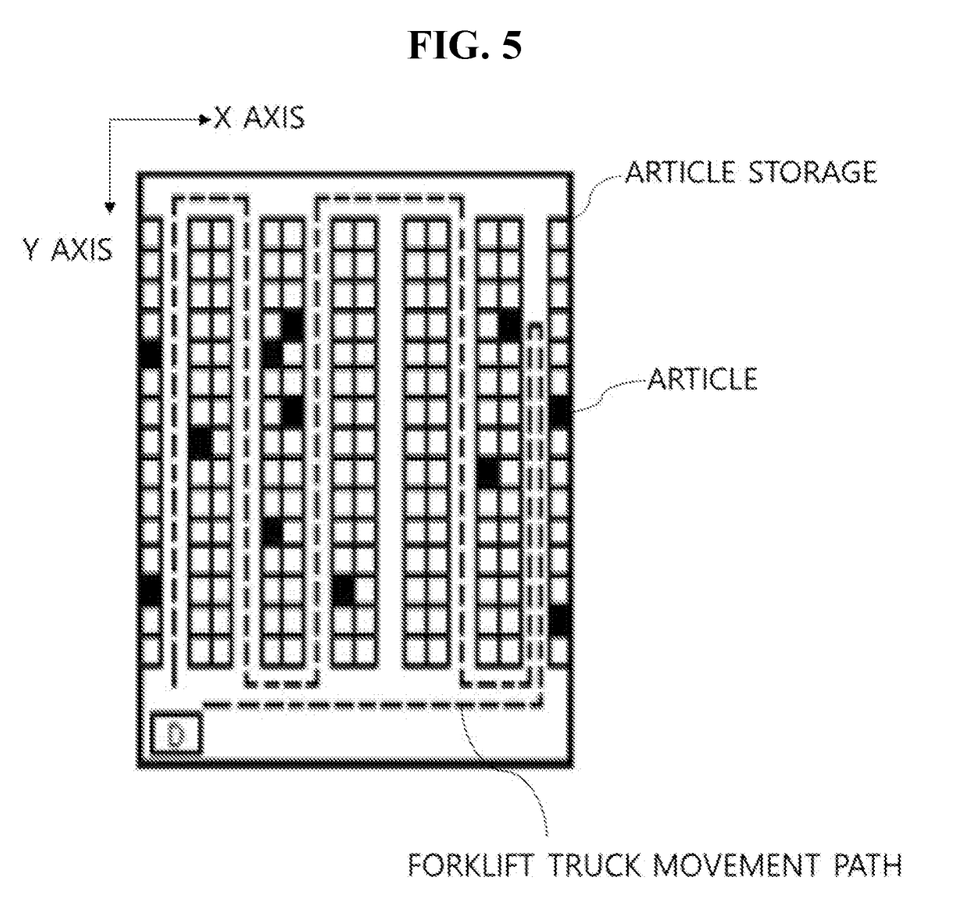
FIG. 5 is an exemplary diagram illustrating providing movement path information to the forklift truck according to an embodiment of the present disclosure.

FIG. 5 is an exemplary diagram illustrating providing the movement path information to the forklift truck according to an embodiment of the present disclosure.

Referring to FIG. 5, the situations of the article storage located in the article storage zone of the distribution warehouse and the article stored in the article storage may be provided on the display panel disposed in the forklift truck, and the movement path of the forklift truck passing through the passage zone may be provided. Accordingly, even when a size of the article distribution warehouse is large, the driver of the forklift truck can correctly track the location at which the article is to be stored and load the article at the location.

Hereinbefore, the present disclosure is described with reference to preferred embodiments of the present application. However, a person skilled in the art can appreciate that various modifications and changes can be made in the present application without departing from spirit and scope of the present disclosure as set forth in the claims below.

As described above, the CPS-based smart forklift truck management device according to the present disclosure can be used in the supply chain management system (SCM) which integrates and manage all systems regarding the inventory management, the loading, and the receiving and shipping of the article in the distribution warehouse.

The present disclosure has the following effects. However, since a specific embodiment does not mean to include all of the following effects or only the following effects, it should not be understood that a scope of the disclosed technology is limited by the specific embodiment.

According to the CPS-based smart forklift truck management device of an embodiment of the present disclosure, it is possible to visualize the supply chain of the distribution warehouse through the digital twin for the space within the distribution warehouse and track the article loading location and the forklift truck location so as to optimize and manage the movement path of the forklift truck.

According to the CPS-based smart forklift truck management device of an embodiment of the present disclosure, it is possible to track the movement direction of the forklift truck through the RFID readers disposed on both the right and left sides of the forklift truck to provide the information on the movable path of the forklift truck and optimize the movement process of the forklift truck.

According to the CPS-based smart forklift truck management device of an embodiment of the present disclosure, it is possible to effectively select the loading locations for the plurality of articles received in the distribution warehouse.

According to the CPS-based smart forklift truck management device of an embodiment of the present disclosure, it is possible to provide the height adjustment information of the forklift of the forklift truck according to the location of the storage cell on which the article is loaded among the plurality of storage cells located in the article storage and load the article at a correct location.

According to the CPS-based smart forklift truck management device of an embodiment of the present disclosure, it is possible to check whether or not the forklift truck is actually driven and whether or not the driver of the forklift truck is registered according to the dispatch schedule of the forklift truck to manage the forklift truck driving history such as who (forklift truck drive) or when (driving time), prevent a risk of the forklift truck driving, and directly control the forklift truck driving.

What is claimed is:

1. A Cyber-Physical System (CPS)-based smart forklift truck management device comprising:
   a space information collector configured to collect distribution warehouse space information;
   a distribution warehouse visualizer configured to generate a digital twin for a distribution warehouse space based on the collected distribution warehouse space information and visualize a loading situation of an article storage and a movement situation of a forklift truck on the distribution warehouse space digital twin;
   a movement path information provider configured to select a target location at which an article is to be stored based on the visualized distribution warehouse space digital twin and provides information a path through which the forklift truck is movable to the target location to the forklift truck; and
   a height adjustment information provider configured to provide forklift height adjustment information of the forklift truck according to a location of a storage cell corresponding to the article storage when the forklift truck arrives at the article storage corresponding to the target location,
   wherein the space information collector identifies an RFID tag located in the article storage through an RFID reader array located on a ceiling of the distribution warehouse to collect location information on an article storage zone and a passage zone and identifies an RFID tag located in the forklift truck to collect identification information and location information of the forklift truck, and
   wherein the space information collector identifies an RFID tag located in the article stored in an adjacent article storage while the forklift truck moves through an RFID reader disposed on each of a right side and a left side of the forklift truck to collect movement direction information of the forklift truck.

2. The CPS-based smart forklift truck management device according to claim 1, wherein the space information collector identifies an RFID tag of the article storage cell located in front of the forklift truck through an RFID reader located on a front side of the forklift truck to collect location information of a cell to store the article.

3. The CPS-based smart forklift truck management device according to claim 1, wherein the movement path information provider provides a display panel disposed in the forklift truck with a shortest path, on a ground of the distribution warehouse, through which the forklift truck can move from a current location of the forklift truck to a target location at which the article is to be stored.

4. The CPS-based smart forklift truck management device according to claim 3, wherein the movement path information provider determines the article storage of the article associated with the article of the forklift truck based on an article loading status including a type of the article to be stored in the article storage and a load capacity of the article storage, selects a location of the article storage as the target location, and generates an article loading path plan based on the current location of the forklift truck.

5. The CPS-based smart forklift truck management device according to claim 1, further comprising:
   a forklift truck driving history management configured to check whether or not the forklift truck is driven according to a dispatch schedule and whether or not a driver is registered based on the identification information of the forklift truck collected by the space information collector and manage a forklift truck driving history including the driver and a driving time of the forklift truck to control driving of the forklift truck.

6. A Cyber-Physical System (CPS)-based smart forklift truck management device comprising:
   a space information collector configured to collect distribution warehouse space information;
   a distribution warehouse visualizer configured to generate a digital twin for a distribution warehouse space based on the collected distribution warehouse space information and visualize a loading situation of an article storage and a movement situation of a forklift truck on the distribution warehouse space digital twin;
   a movement path information provider configured to select a target location at which an article is to be stored based on the visualized distribution warehouse space digital twin and provides information a path through which the forklift truck is movable to the target location to the forklift truck; and
   a height adjustment information provider configured to provide forklift height adjustment information of the forklift truck according to a location of a storage cell corresponding to the article storage when the forklift truck arrives at the article storage corresponding to the target location,
   wherein in consideration of disposition on an array for a specific RFID reader identifying the RFID tag from the distribution warehouse space information, the distribution warehouse visualizer generates a first location coordinate based on a horizontal plane for the article storage and the passage and a second location coordinate based on a horizontal plane for the forklift truck to visualize the loading situation of the article storage and the movement situation of the forklift truck on the distribution warehouse space digital twin.

7. A Cyber-Physical System (CPS)-based smart forklift truck management device comprising:
   a space information collector configured to collect distribution warehouse space information;
   a distribution warehouse visualizer configured to generate a digital twin for a distribution warehouse space based on the collected distribution warehouse space information and visualize a loading situation of an article storage and a movement situation of a forklift truck on the distribution warehouse space digital twin;
   a movement path information provider configured to select a target location at which an article is to be stored based on the visualized distribution warehouse space digital twin and provides information a path through which the forklift truck is movable to the target location to the forklift truck; and
   a height adjustment information provider configured to provide forklift height adjustment information of the forklift truck according to a location of a storage cell corresponding to the article storage when the forklift truck arrives at the article storage corresponding to the target location,
   wherein the height adjustment information provider identifies a tag attached to the storage cell of the article storage through an RFID reader disposed on a front side of the forklift truck to obtain a height from a bottom surface to the storage cell and provides the height to the storage cell to a display panel attached to the forklift truck.

* * * * *